(12) United States Patent
Watanabe

(10) Patent No.: US 8,400,729 B1
(45) Date of Patent: Mar. 19, 2013

(54) METHOD OF MANUFACTURING MOTOR, MOTOR, AND DISK DRIVE APPARATUS

(75) Inventor: Tsuchitsugu Watanabe, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/437,103

(22) Filed: Apr. 2, 2012

(30) Foreign Application Priority Data

Dec. 1, 2011 (JP) .................................. 2011-263570

(51) Int. Cl.
G11B 17/02 (2006.01)
(52) U.S. Cl. ..................................................... 360/99.08
(58) Field of Classification Search ............... 360/99.08, 360/99.16, 98.07
See application file for complete search history.

(56) References Cited

U.S. PATENT DOCUMENTS

| | | | |
|---|---|---|---|
| 5,572,381 A | 11/1996 | Stewart | |
| 6,118,198 A | 9/2000 | Hollenbeck et al. | |
| 6,652,324 B2 | 11/2003 | Maiers et al. | |
| 6,771,460 B2 | 8/2004 | Nii et al. | |
| 7,012,191 B1 | 3/2006 | Watanabe et al. | |
| 7,105,963 B2 | 9/2006 | Ito et al. | |
| 7,144,275 B2 | 12/2006 | Iida | |
| 7,254,882 B2 | 8/2007 | Ito et al. | |
| 7,684,146 B1 | 3/2010 | Andrikowich et al. | |
| 7,757,378 B1 | 7/2010 | Mann et al. | |
| 8,120,217 B2 | 2/2012 | Yawata et al. | |
| 8,120,872 B2 * | 2/2012 | Sekii et al. | 360/99.08 |
| 8,120,873 B2 * | 2/2012 | Uchibori et al. | 360/99.08 |
| 8,164,851 B2 | 4/2012 | Yoneda et al. | |
| 2005/0206255 A1 | 9/2005 | Yoshino et al. | |
| 2006/0023339 A1 | 2/2006 | Fukuyama et al. | |
| 2006/0281229 A1 | 12/2006 | Koh et al. | |
| 2009/0161252 A1 * | 6/2009 | Okinaga et al. | 360/99.08 |
| 2009/0316299 A1 | 12/2009 | Tashiro et al. | |
| 2012/0075746 A1 * | 3/2012 | Yoneda et al. | 360/99.08 |
| 2012/0092792 A1 * | 4/2012 | Sugi et al. | 360/97.12 |
| 2012/0200957 A1 * | 8/2012 | Yawata | 360/99.08 |

FOREIGN PATENT DOCUMENTS

| | | |
|---|---|---|
| JP | 07-075275 A | 3/1995 |
| JP | 07-107693 A | 4/1995 |
| JP | 07-222386 A | 8/1995 |
| JP | 07-334967 A | 12/1995 |
| JP | 11-218128 A | 8/1999 |

(Continued)

OTHER PUBLICATIONS

Yawata et al., "Spindle Motor and Storage Disk Drive Apparatus", U.S. Appl. No. 13/352,442, filed Jan. 18, 2012.

(Continued)

*Primary Examiner* — Allen T Cao
(74) *Attorney, Agent, or Firm* — Keating & Bennett, LLP

(57) ABSTRACT

A method of manufacturing a motor including a rotating portion and a stationary portion including a stator, a base portion, and a circuit board preferably includes the steps of: a) arranging the stator at a predetermined position on the base portion, and arranging a lead wire of a coil of the stator at a position on a far side of an imaginary cylindrical surface centered on a central axis and which touches top surfaces of teeth of a stator core with respect to the top surfaces; b) arranging a shield between a land portion of the circuit board and the top surfaces; c) soldering the lead wire to the land portion, the lead wire extending along an upper surface of the circuit board through a gap between the shield and the circuit board; d) removing the shield; and e) attaching the rotating portion to the stationary portion.

19 Claims, 11 Drawing Sheets

FOREIGN PATENT DOCUMENTS

| JP | 2000-209804 A | 7/2000 |
|---|---|---|
| JP | 2000-306319 A | 11/2000 |
| JP | 2001-067775 A | 3/2001 |
| JP | 2005-057892 A | 3/2005 |
| JP | 2005-210787 A | 8/2005 |
| JP | 2006-040423 A | 2/2006 |
| JP | 2006-100252 A | 4/2006 |
| JP | 2006-185553 A | 7/2006 |
| JP | 2006-187145 A | 7/2006 |
| JP | 2009-110611 A | 5/2009 |
| JP | 2009-189157 A | 8/2009 |
| JP | 2010-009644 A | 1/2010 |
| JP | 2011-114892 A | 6/2011 |

OTHER PUBLICATIONS

Yawata et al., "Spindle Motor and Storage Disk Drive Apparatus", U.S. Appl. No. 13/352,445, filed Jan. 18, 2012.

Sugi et al., "Spindle Motor, Disk Drive Apparatus, and Method of Manufacturing Spindle Motor", U.S. Appl. No. 13/241,773, filed Sep. 23, 2011.

Saichi et al., "Spindle Motor Having Connecting Mechanism Connecting Lead Wire and Circuit Board, and Storage Disk Drive Having the Same", U.S. Appl. No. 13/029,143, filed Feb. 17, 2011.

Sugi et al., "Spindle Motor, and Disk Drive Apparatus Including the Spindle Motor", U.S. Appl. No. 13/334,620, filed Dec. 22, 2011.

Matsuyama et al., "Spindle Motor, Disk Drive Apparatus, and Method of Manufacturing Spindle Motor", U.S. Appl. No. 13/424,632, filed Mar. 20, 2012.

Sugi et al., "Motor Unit and Disk Drive Apparatus", U.S. Appl. No. 13/290,209, filed on Nov. 7, 2011.

Watanabe et al., "Spindle Motor and Disk Drive Apparatus", U.S. Appl. No. 61/625,128, filed Apr. 17, 2012.

Watanabe et al., "Base Unit, Spindle Motor, and Disk Drive Apparatus", U.S. Appl. No. 61/625,132, filed Apr. 17, 2012.

Yawata et al., "Spindle Motor and Storage Disk Drive Apparatus", U.S. Appl. No. 12/849,868, filed on Aug. 4, 2010.

Yawata, "Spindle Motor, Disk Drive Apparatus, and Method of Manufacturing Spindle Motor", U.S. Appl. No. 13/365,286, filed Feb. 3, 2012.

* cited by examiner

METHOD OF MANUFACTURING MOTOR, MOTOR, AND DISK DRIVE APPARATUS

BACKGROUND OF THE INVENTION

1. Field of the Invention

The present invention relates to an electric motor and more specifically, to an electric motor for use in a hard disk drive.

2. Description of the Related Art

Disk drive apparatuses, such as hard disk drives, typically have spindle motors arranged to rotate disks installed therein. An example of a conventional spindle motor is disclosed in JP-A 11-218128 and includes a motor frame, a housing, a stator, and flexible printed wiring. The housing is cylindrical in shape and is defined integrally with the motor frame. The stator is press fitted and thereby fixed to an outer circumference of the housing. Terminals of coil wires of coils included in the stator are connected to the flexible printed wiring, which is arranged on an upper surface of the motor frame, through solder.

An interior space of a disk drive disclosed in JP-A 2006-40423 is filled with a low-density gas, such as helium, hydrogen, or the like. This contributes to preventing vibrations of a disk and a head, thereby enabling highly accurate data recording.

In the case where lead wires of coils are connected to a circuit board through a solder at positions radially outward of a stator, the solder may come into contact with a rotor magnet of a motor. In the case where the coil wires and the flexible printed wiring are connected to each other through the solder under an outer edge portion of a stator core as described in JP-A 11-218128, the operation of performing the soldering may be cumbersome. Moreover, it is very likely that fumes or flux will be adhered to the stator during the soldering operation.

SUMMARY OF THE INVENTION

According to a preferred embodiment of the present invention, a method of manufacturing a motor preferably including the following steps a), b), c), d), and e) is provided. The motor manufactured in accordance with the present preferred embodiment preferably includes a rotating portion and a stationary portion including a stator, a base portion, and a circuit board. In step a), the stator is arranged at a predetermined position on the base portion, and a lead wire of a coil of the stator is arranged at a position on a far side of an imaginary cylindrical surface centered on a central axis and which touches top surfaces of teeth of a stator core with respect to the top surfaces. In step b), a shield is arranged between a land portion of the circuit board and the top surfaces. In step c), the lead wire is soldered to the land portion, with the lead wire extending along an upper surface of the circuit board through a gap between the shield and the circuit board. In step d), the shield is removed. In step e), the rotating portion is attached to the stationary portion.

According to another preferred embodiment of the present invention, a motor that is preferably used in a disk drive apparatus is provided. The motor preferably includes a stationary portion, a rotating portion, and a bearing mechanism. The stationary portion includes a stator. The rotating portion includes a rotor magnet. The rotor magnet is arranged radially outward of the stator. The bearing mechanism is arranged to support the rotating portion such that the rotating portion is rotatable about a central axis with respect to the stationary portion. The stationary portion preferably includes a base portion and a circuit board. The base portion is arranged to define a portion of a housing of the disk drive apparatus. The circuit board is preferably arranged on an upper surface of the base portion. A lead wire of a coil of the stator preferably includes an inclined portion arranged to extend between the stator and the circuit board while being inclined radially outward with decreasing height; a tip portion arranged to extend radially outward along an upper surface of the circuit board, and to be soldered onto the circuit board outside of a stator core of the stator; and a bent or curved portion preferably defined between the inclined portion and the tip portion, and arranged below an outer circumferential surface of the stator core. At least a portion of a solder portion on the circuit board is preferably arranged to overlap with the rotor magnet in an axial direction.

The present invention makes it possible to prevent fumes and/or flux from being adhered to the stator, and also to prevent the lead wire of the coil and the rotor magnet from interfering with each other.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
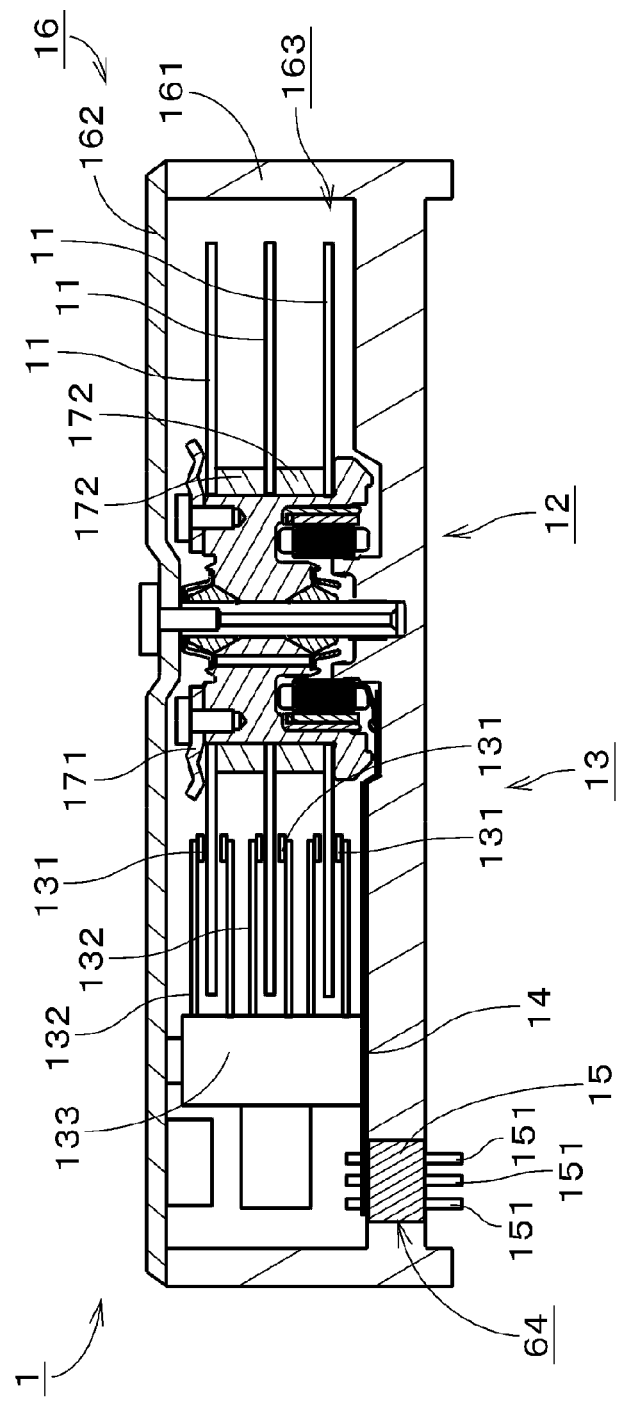
FIG. 1 is a cross-sectional view of a disk drive apparatus according to a preferred embodiment of the present invention.

It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides should not be construed to restrict relative positions or directions of different members or portions when the motor is actually installed in a device. Also note that a direction parallel or substantially parallel to the central axis is referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

FIG. 1 is a cross-sectional view of a disk drive apparatus 1 including a spindle motor (hereinafter referred to simply as a "motor") 12 according to a preferred embodiment of the present invention. The disk drive apparatus 1 is a so-called hard disk drive. The disk drive apparatus 1 preferably includes a plurality of disks 11, the motor 12, an access portion 13, a connector 15, and a housing 16, for example. Each disk 11 is in the shape of a disc, and is arranged to store information therein. Each disk 11 is attached to the motor 12. The access portion 13 is arranged to perform at least one of reading and writing of information from or to each disk 11. The number of disks 11 is preferably three in the present preferred embodiment, for example. Note, however, that the number of disks 11 may be any desirable number other than three.

The housing 16 preferably includes a first housing member 161 and a second housing member 162. The first housing member 161 preferably has a shape of a box without a lid. The second housing member 162 is preferably provided in the shape of a plate. The disks 11, the motor 12, and the access portion 13 are contained in the housing 16. The second housing member 162 is joined to the first housing member 161 preferably through welding, for example, or by another joining method to define the housing 16 of the disk drive apparatus 1. An interior space 163 of the housing 16 is preferably thereby hermetically enclosed. The interior space 163 is arranged to contain extremely little dirt or dust. In addition, an interior of the housing 16 is preferably filled with a low-density gas, such as, for example, helium, a mixture of helium and air, or the like.

The disks 11 are preferably arranged at regular intervals in an axial direction through spacers 172. In addition, the disks 11 are preferably clamped to the motor 12 through a clamper 171. The access portion 13 preferably includes a plurality of heads 131, a plurality of arms 132, and a head actuator mechanism 133. Each arm 132 is arranged to support a separate one of the heads 131. Here, the number of heads 131 is preferably six, however, any other desirable number could be used. The number of arms 132 is also preferably six, however, any other desirable number could be used. The head actuator mechanism 133 is arranged to actuate each arm 132 to move a corresponding one of the heads 131 relative to a corresponding one of the disks 11. The above arrangement enables each head 131 to make access to a desired location on the corresponding disk 11 while being arranged in close proximity to the rotating disk 11, to perform the reading and the writing of information.

Figure 2:
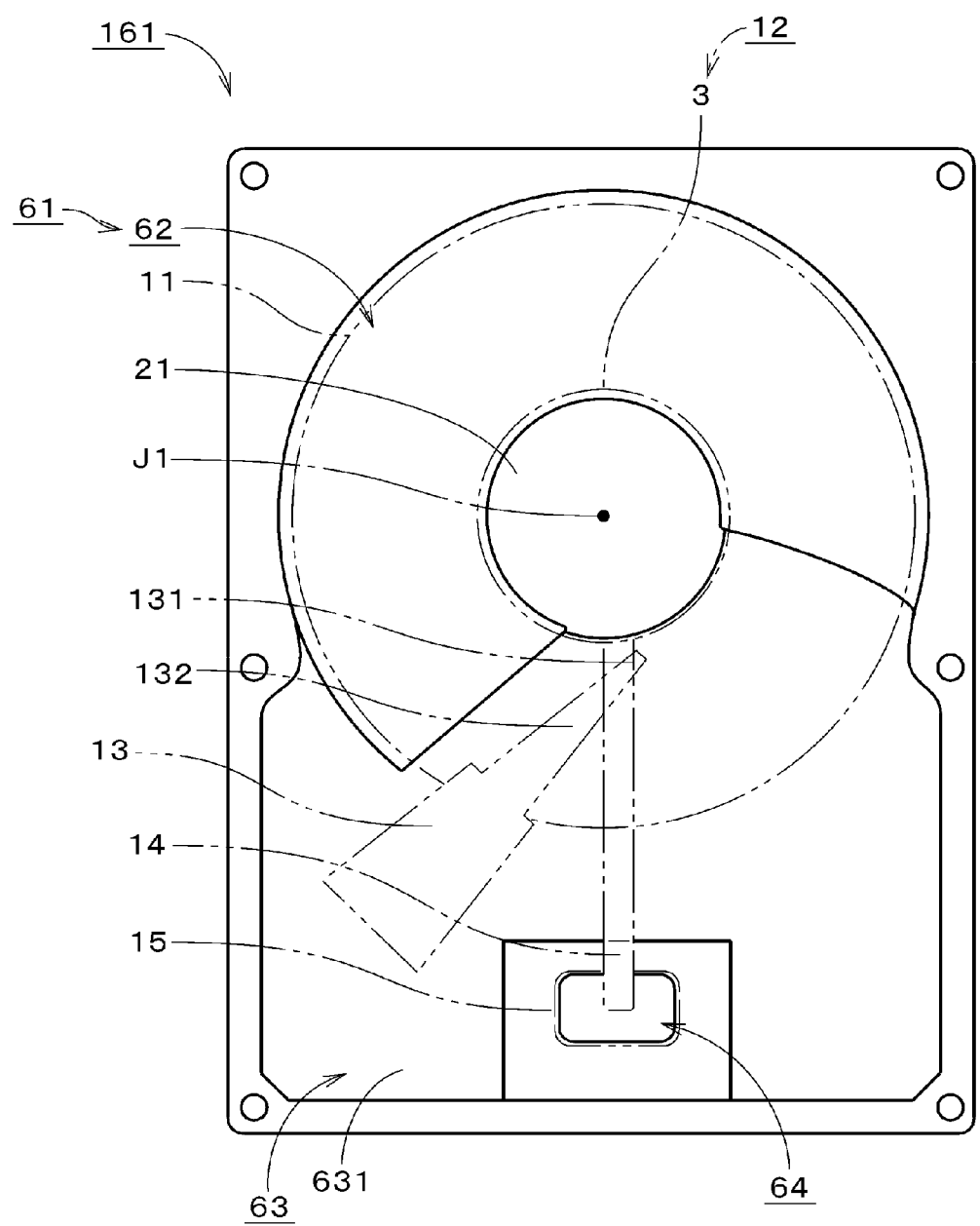
FIG. 2 is a plan view of a first housing member according to a preferred embodiment of the present invention.

FIG. 2 is a plan view of the first housing member 161. In FIG. 2, a rotating portion 3 and a circuit board 14 of the motor 12, the disks 11, the access portion 13, and the connector 15 are all represented by chain double-dashed lines. A bottom portion 61 of the first housing member 161 preferably includes a base portion 21, a disk-accommodating recessed portion 62, an access portion-accommodating recessed portion 63, and a through hole 64. The base portion 21 is arranged to define a portion of the motor 12. The disk-accommodating recessed portion 62 preferably includes a portion which is arranged substantially in the shape of the letter "C" and centered on a central axis J1. The disk-accommodating recessed portion 62 is arranged to accommodate large portions of the disks 11.

The access portion 13 is attached to the access portion-accommodating recessed portion 63. The range of movement of each arm 132 of the access portion 13 overlaps with the access portion-accommodating recessed portion 63. A bottom surface 631 of the access portion-accommodating recessed portion is arranged at a level axially lower than that of a bottom surface of the disk-accommodating recessed portion 62. A portion of each disk 11 is arranged over the access portion-accommodating recessed portion 63. The inclusion of the access portion-accommodating recessed portion 63 in the disk drive apparatus 1 contributes to preventing each head 131 from coming into contact with the bottom portion 61 of the first housing member 161 while the motor 12 is driven.

The access portion-accommodating recessed portion 63 preferably includes a portion which is slightly recessed relative to a surrounding area, and the through hole 64 is preferably defined in this portion. Referring to FIGS. 1 and 2, the connector 15 is fitted in the through hole 64 preferably through, for example, an adhesive or the like. The housing 16 of the disk drive apparatus 1 preferably includes only one through hole. The through hole 64 is preferably hermetically sealed with the connector 15. Therefore, the gas, e.g., helium, with which the interior of the housing 16 is filled is prevented from leaking out through the through hole 64.

Figure 3:
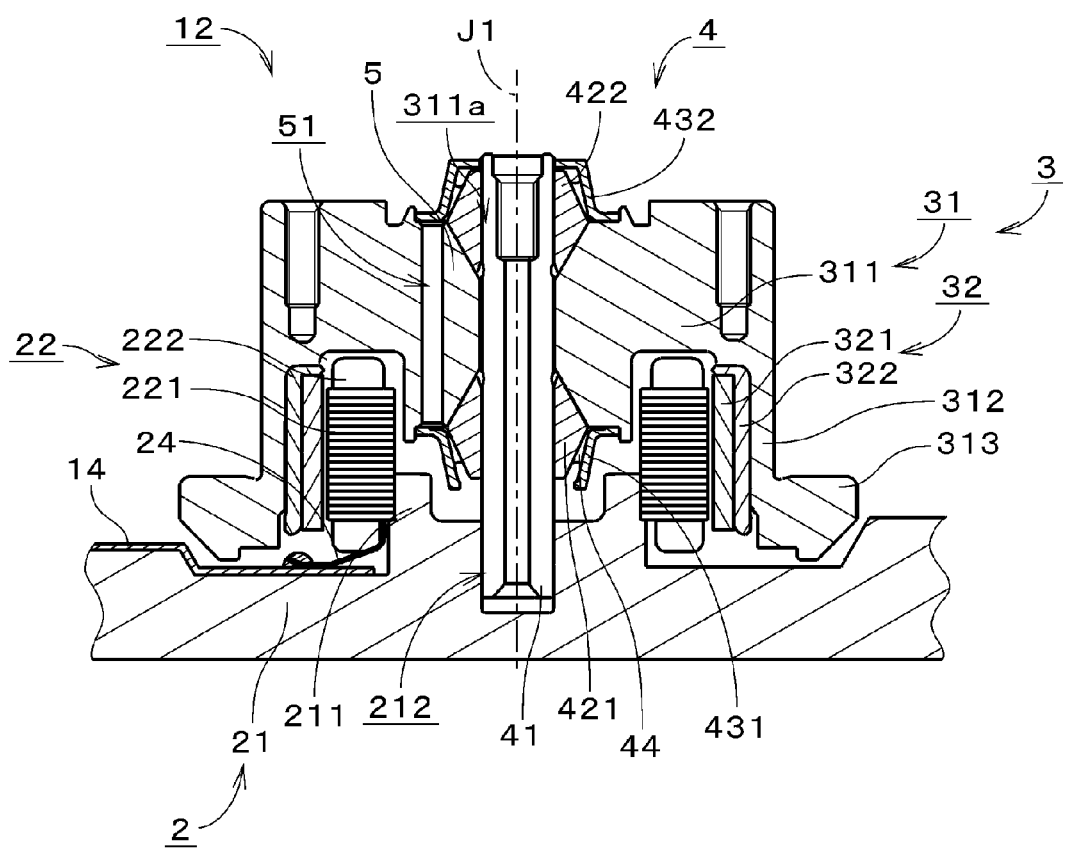
FIG. 3 is a cross-sectional view of a motor according to a preferred embodiment of the present invention.

FIG. 3 is a cross-sectional view of the motor 12. The motor 12 is preferably an outer-rotor motor. In the present preferred embodiment, the motor 12 is preferably a three-phase motor, having U, V, and W phases. The motor 12 preferably includes a stationary portion 2, which is a stationary assembly, the rotating portion 3, which is a rotating assembly, and a fluid dynamic bearing mechanism 4 (hereinafter referred to as a "bearing mechanism 4"). The rotating portion 3 is supported through the bearing mechanism 4 such that the rotating portion 3 is rotatable about the central axis J1 of the motor 12 with respect to the stationary portion 2.

The stationary portion 2 includes the base portion 21, an annular stator 22, and the circuit board 14. The base portion preferably includes a substantially cylindrical holder 211 arranged in a center of the base portion 21. The stator 22 is preferably arranged around the holder 211. The stator 22 preferably includes a stator core 221 and coils 222. The coils 222 are arranged on the stator core 221. Each of a common wire and a plurality of (preferably three in the present preferred embodiment) lead wires, which are drawn out from U-phase, V-phase, and W-phase coils, respectively, of the stator 22, is soldered to the circuit board 14. Hereinafter, the lead wires and the common wire will be referred to collectively as "lead wires 24".

The circuit board 14 is preferably a flexible printed circuit board. Referring to FIG. 2, the circuit board 14 is arranged on an upper surface of the bottom portion 61 of the first housing member 161, and arranged to extend from the rotating portion 3 toward the through hole 64.

Referring to FIG. 1, the connector 15 preferably includes a plurality of pins 151. One end portion of each pin 151 is arranged inside the housing 16, and connected to the circuit board 14 therein. An opposite end portion of each pin 151 is arranged to project downward from the housing 16, and is connected to an external power supply. Power is thereby supplied from the external power supply to the motor 12. Note that supply of electricity to other members, such as the access portion 13, and control of the other members, are also carried out through the connector 15.

Figure 4:
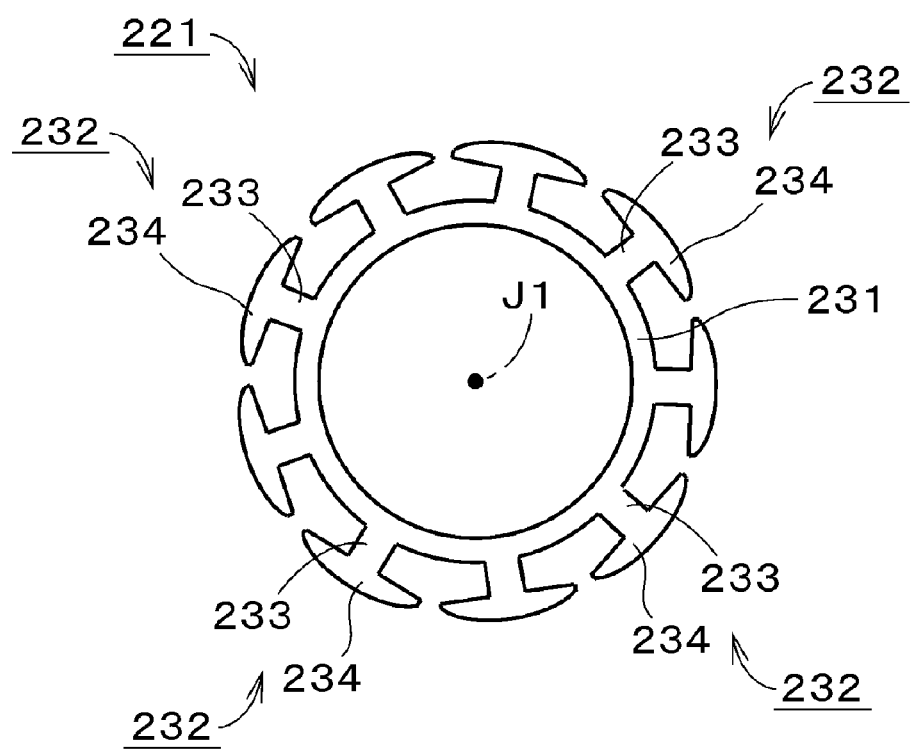
FIG. 4 is a plan view of a stator core according to a preferred embodiment of the present invention.

FIG. 4 is a plan view of the stator core 221. The stator core 221 preferably includes a core back 231 and a plurality of teeth 232. The core back 231 is preferably arranged in an annular shape and centered on the central axis J1. The teeth 232 are arranged to extend radially outward from an outer edge portion of the core back 231. Each of the teeth 232 includes a winding portion 233 and a top portion 234. A conducting wire is preferably wound around the winding portion 233 of each tooth 232 to define the coils 222 (see FIG. 3). The top portion 234 of each tooth 232 is arranged to extend to both sides in a circumferential direction from an outer edge portion of the winding portion 233 of the tooth 232.

Referring to FIG. 3, the rotating portion 3 preferably includes a rotor hub 31 and a magnetic member 32. The rotor hub 31 preferably includes a hub body 311, a cylindrical portion 312, and an annular disk mount portion 313. The cylindrical portion 312 is arranged to project downward from an outer edge portion of the hub body 311. The disk mount portion 313 is arranged to extend radially outward from a bottom portion of the cylindrical portion 312. A lowermost one of the disks 11 is mounted on the disk mount portion 313 as illustrated in FIG. 1. The magnetic member 32 preferably includes an annular rotor magnet 321, which is centered on the central axis J1, and a back iron 322. The rotor magnet 321 is preferably arranged inside the cylindrical portion 312 with the back iron 322 intervening therebetween. The disk mount portion 313 is arranged radially outside a lower portion of the rotor magnet 321. The rotor magnet 321 is arranged radially outward of the stator 22. In the motor 12, a torque is generated between the rotor magnet 321 and the stator 22.

The hub body 311 preferably includes a hole portion 311a arranged to extend in the axial direction. A portion 5 of the hub body 311 which is arranged in the vicinity of the central axis J1 and which includes the hole portion 311a will be hereinafter referred to as a "sleeve portion 5". The sleeve portion 5 preferably includes a communicating hole 51 arranged to extend in the vertical direction therethrough in the vicinity of the hole portion 311a.

The bearing mechanism 4 preferably includes a shaft 41, a first cone portion 421, a second cone portion 422, a first cover member 431, a second cover member 432, and a lubricating oil 44. The shaft 41 is arranged in the hole portion 311a of the sleeve portion 5. When the motor 12 is in an assembled state, a bottom portion of the shaft 41 is preferably arranged in a non-through hole (i.e., a blind hole) portion 212 defined inside of the holder 211, so that the shaft 41 remains stationary while being oriented in the vertical direction along the central axis J1.

The first cone portion 421 is arranged on a lower side of the sleeve portion 5. The second cone portion 422 is arranged on an upper side of the sleeve portion 5. The first cover member 431 is arranged on a bottom portion of the sleeve portion 5 to cover a lower portion of an outside surface of the first cone portion 421. The second cover member 432 is arranged on a top portion of the sleeve portion 5 to cover an upper end and an upper portion of an outside surface of the second cone portion 422.

Figure 5:
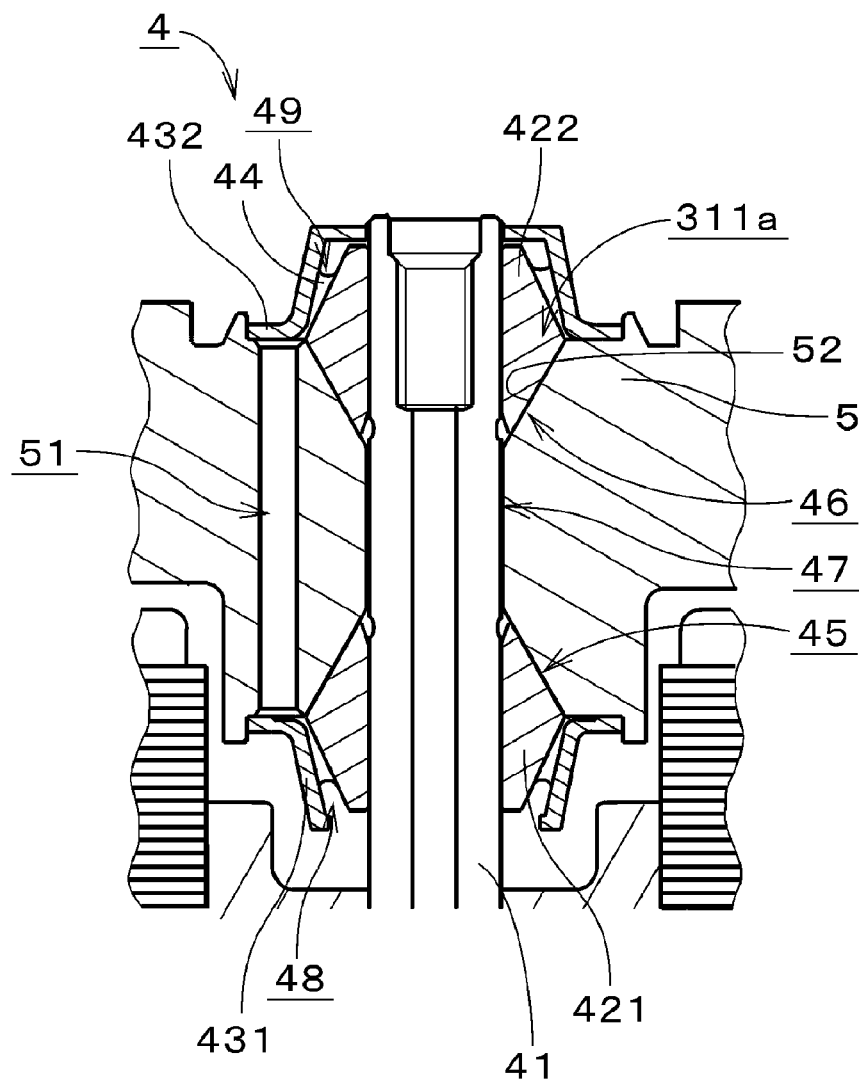
FIG. 5 is a cross-sectional view of the motor according to a preferred embodiment of the present invention.

FIG. 5 is a diagram illustrating the bearing mechanism 4 in an enlarged form. A lower portion of an inside surface 52 of the hole portion 311a of the sleeve portion 5 is preferably arranged to be inclined radially outward with decreasing height, while an upper portion of the inside surface 52 is arranged to be inclined radially outward with increasing height.

A first inclined gap 45 is defined between the first cone portion 421 and the lower portion of the inside surface 52 of the sleeve portion 5, and is arranged to be inclined radially outward with decreasing height. A second inclined gap 46 is defined between the second cone portion 422 and the upper portion of the inside surface 52 of the sleeve portion 5, and is arranged to be inclined radially outward with increasing height. The lubricating oil 44 is arranged to fill a gap 47, which is defined between the shaft 41 and a middle portion of the sleeve portion 5, the first inclined gap 45, the communicating hole 51, and the second inclined gap 46. In the bearing mechanism 4, a surface of the lubricating oil 44 is arranged in a gap 48 defined between the first cover member 431 and the first cone portion 421, and another surface of the lubricating oil 44 is arranged in a gap 49 defined between the second cover member 432 and the second cone portion 422.

While the motor 12 is driven, a fluid dynamic pressure is generated through the lubricating oil 44 in each of the first and second inclined gaps 45 and 46. The sleeve portion 5 is thereby supported to be rotatable with respect to the shaft 41. In the motor 12, the sleeve portion 5 is arranged to define a portion of the bearing mechanism 4 as a portion supported by the shaft 41.

Figure 6:
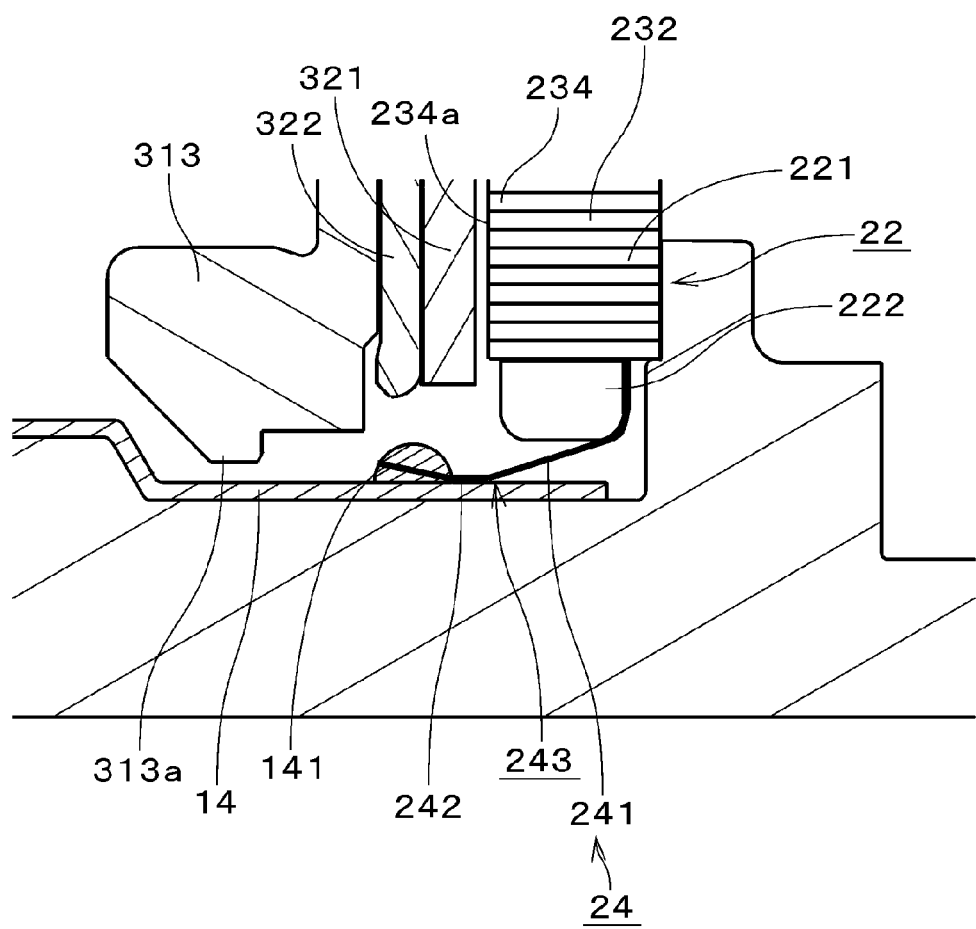
FIG. 6 is a cross-sectional view of the motor according to a preferred embodiment of the present invention.

FIG. 6 is a diagram illustrating a lower portion of the stator 22 and its vicinity in an enlarged form. Each of the lead wires 24 of the coils 222 preferably includes an inclined portion 241 and a tip portion 242. The inclined portion 241 is arranged to extend between the stator 22 and the circuit board 14 while being inclined radially outward with decreasing height. The tip portion 242 is arranged to extend radially outward along an upper surface of the circuit board 14. The tip portion 242 is soldered onto the circuit board 14 outside of the stator core 221. The top portion 234 of each tooth 232 defines a top surface of the tooth 232. A bent portion 243 of the lead wire 24 which is defined between the inclined portion 241 and the tip portion 242 is preferably arranged below an outer circumferential surface 234a of the top portion 234.

Solder portions 141 are preferably arranged on the circuit board 14 at a position radially outward of the stator core 221, and arranged to overlap with the rotor magnet 321 and the back iron 322 in the axial direction. An upper end of each solder portion 141 is arranged at an axial level higher than that of a lower end 313a of the disk mount portion 313.

Figure 7:
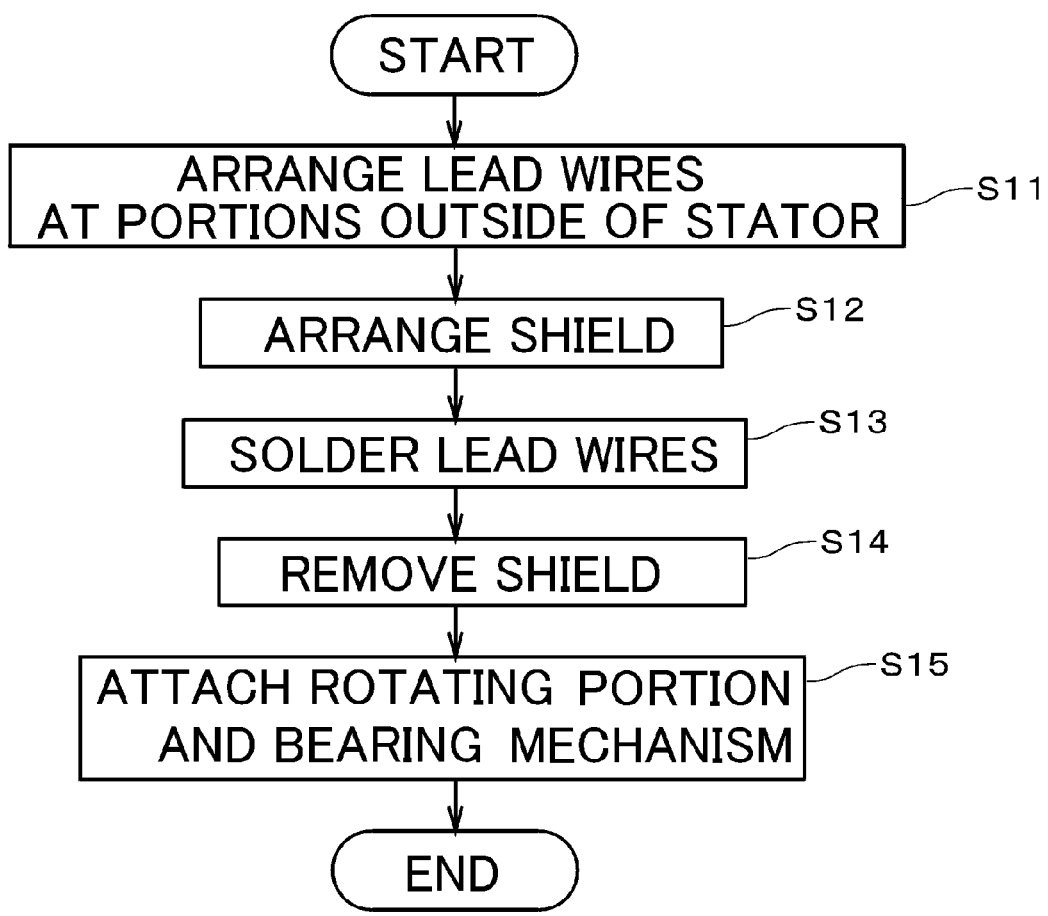
FIG. 7 is a flowchart illustrating a procedure of manufacturing the motor according to a preferred embodiment of the present invention.
Figure 8:
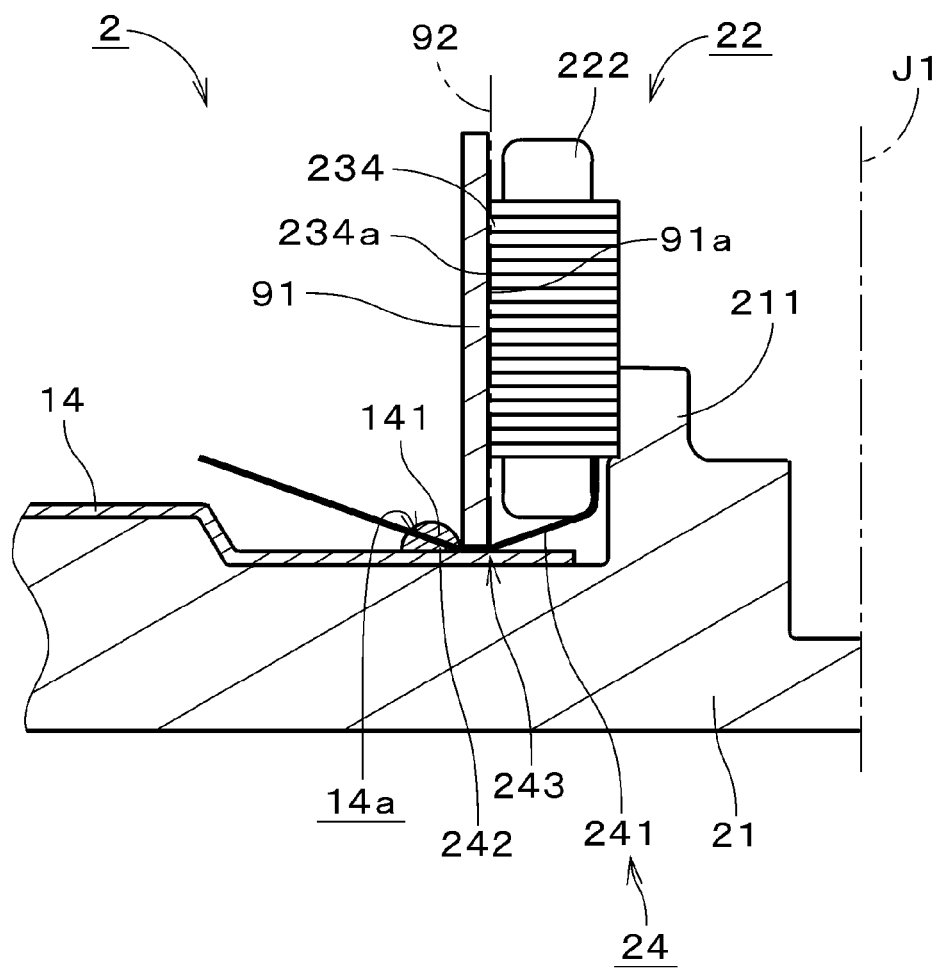
FIG. 8 is a cross-sectional view of a stationary portion in a process of being assembled according to a preferred embodiment of the present invention.

FIG. 7 is a flowchart illustrating a procedure of manufacturing the motor 12. FIG. 8 is a diagram illustrating a portion of the stationary portion 2, illustrating a situation in which each lead wire 24 has just been soldered to the circuit board 14. When the motor 12 is manufactured, the circuit board 14 is preferably first attached to an upper surface of the base portion 21. Next, the stator 22 is preferably arranged around the holder 211 of the base portion 21. The lead wires 24 are preferably drawn from the coils 222 of the stator 22 to positions outside of the stator 22 (step S11). To describe more precisely, each lead wire 24 is drawn to a position spaced away from and radially outward of an imaginary cylindrical surface 92 which is centered on the central axis J1 and which touches the outer circumferential surface 234a of each top portion 234 of the stator core 221.

Figure 9:
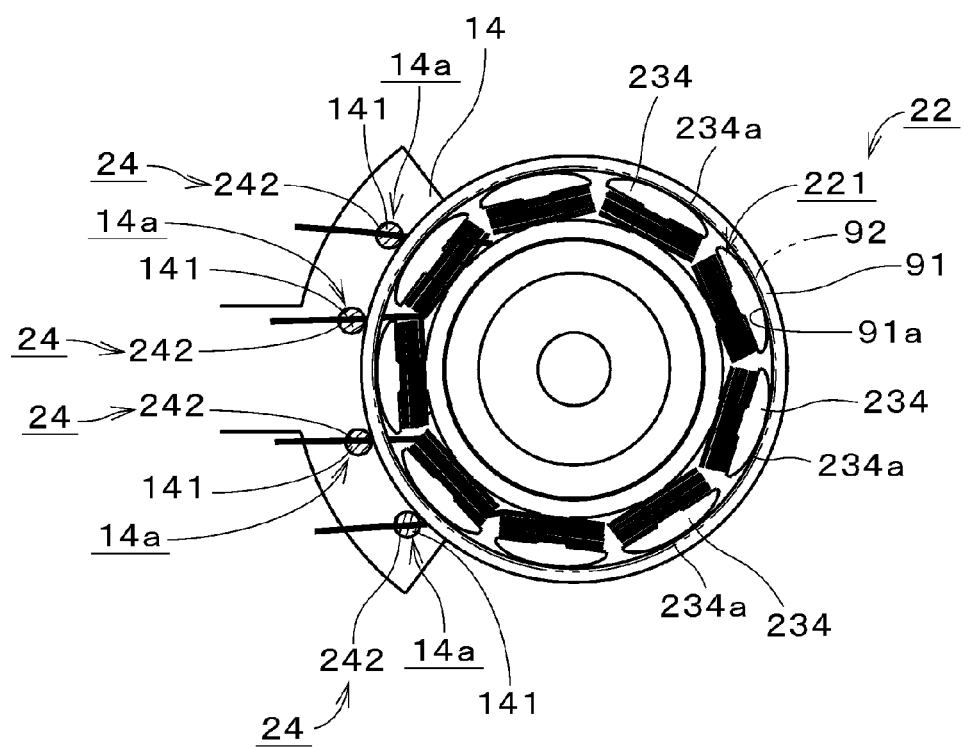
FIG. 9 is a plan view of the stationary portion in the process of being assembled according to a preferred embodiment of the present invention.

A shield 91, which is preferably cylindrical in shape and is centered on a central axis of the stator 22, i.e., the central axis J1, is arranged between the stator 22 and land portions 14a of the circuit board 14 (step S12). Referring to FIG. 9, an inner surface 91a of the shield 91 is preferably arranged to be in contact with a middle portion of each outer circumferential surface 234a. In FIG. 9, passage lines of the stator 22 are not shown. Referring to FIGS. 8 and 9, the inner surface 91a of the shield 91 is arranged to be included in the imaginary cylindrical surface 92. Note that the inner surface 91a of the shield 91 does not necessarily need to be arranged to be in contact with each outer circumferential surface 234a if so desired. The shield 91 is moved downward from above the stator core 221 along the central axis J1 to be brought into contact with each lead wire 24. Referring to FIG. 8, a lower end portion of the shield 91 is brought closer to the circuit board 14 while being in contact with the lead wire 24, until the lower end portion of the shield 91 is brought into indirect contact with the upper surface of the circuit board 14 with the lead wire 24 intervening therebetween. The lead wire 24 is bent as a result. The tip portion 242 is arranged to extend radially outward through a gap between the shield 91 and the circuit board 14. The inclined portion 241 is located inside of the shield 91. The bent portion 243 is defined between the tip portion 242 and the inclined portion 241. Hereinafter, the portion 243 will be referred to as a "bend portion 243". Note, however, that the inclined portion 241 may alternatively be defined by a sagging portion in other preferred embodiments. In this case, the portion 243 defined between the tip portion 242 and the inclined portion 241 is preferably smoothly curved. The bend portion 243 is located below the outer circumferential surface 234a of the top portion 234. Since the shield 91 is cylindrical, the bend portions 243 of the lead wires 24 are arranged on a circle centered on the central axis J1.

Next, referring to FIGS. 8 and 9, the tip portion 242 of each lead wire 24 is soldered to a corresponding one of the land portions 14a of the circuit board 14 (step S13). Then, a portion of each lead wire 24 which extends beyond the solder portion 141 is cut off to complete a soldering operation for the lead wires 24. Next, the shield 91 is removed from the stator 22 (step S14). Then, the bearing mechanism 4 and the rotating portion 3 are attached to the stationary portion 2 as illustrated in FIG. 3 (step S15).

The structure of the disk drive apparatus 1 including the motor 12, and the procedure of manufacturing the motor 12, have been described above. When each lead wire 24 is soldered to the circuit board 14 during manufacture of the motor 12, the shield 91 is arranged around the stator core 221 to prevent fumes and flux from being adhered to the stator 22. Because the shield 91 is cylindrical in shape, it is easy to arrange the shield 91 around the stator 22. The solder portions 141 are arranged radially outward of the top surfaces of the teeth 232. Therefore, the soldering operation can be accomplished easily.

The tip portion 242 of each lead wire 24 is arranged to extend radially outward along the upper surface of the circuit board 14 below the outer circumferential surface 234a of the stator core 221. This reduces the likelihood of interference between the lead wire 24 and the rotor magnet 321 as compared to the case where the lead wire 24 is arranged upward away from the circuit board 14 before being led to the land portion 14a. Each solder portion 141 is arranged radially inward of the disk mount portion 313. This makes it possible to arrange the lower end 313a of the disk mount portion 313 at a level lower than that of the upper end of the solder portion 141. This makes it possible to ensure a sufficient thickness of the disk mount portion 313.

The housing 16 preferably includes only one through hole, that is, the through hole 64 used for external connection. The housing 16 accordingly achieves a reduction in the probability that helium will leak out through a gap between the through hole and the part arranged in the through hole as compared to the case where the housing member includes a plurality of through holes.

Figure 10:
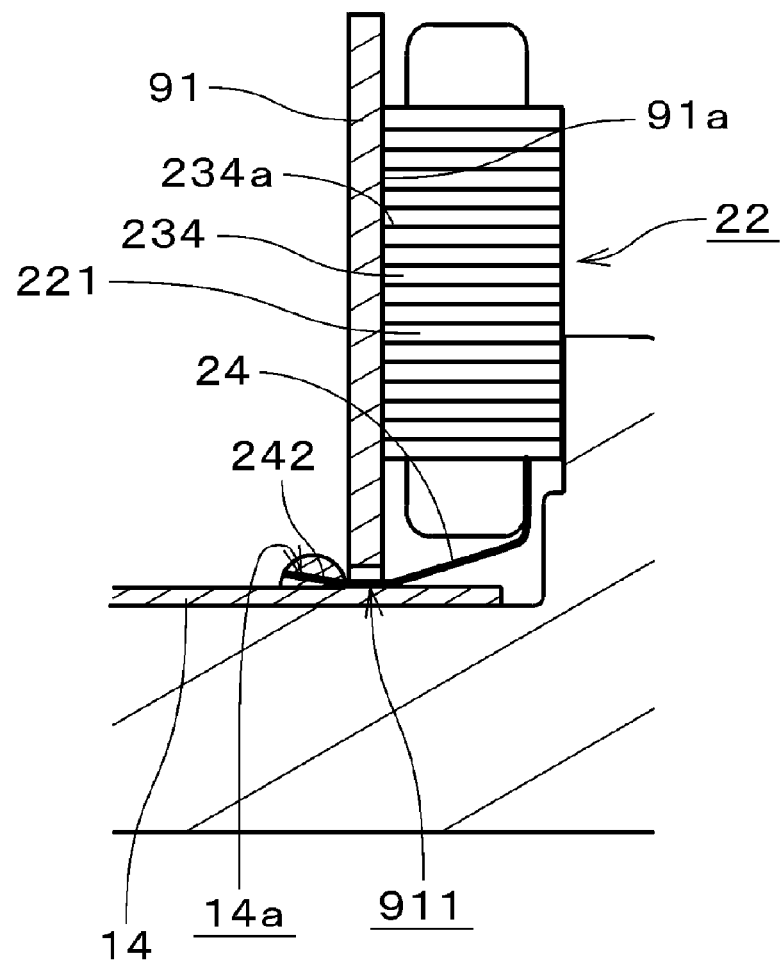
FIG. 10 is a diagram illustrating a shield according to a preferred embodiment of the present invention.

FIG. 10 is a diagram illustrating a shield 91 according to another preferred embodiment of the present invention. A lower end portion of the shield 91 includes a plurality of recessed portions 911 which are recessed upward. Each recessed portion 911 is arranged to extend in the radial direction from an inner surface 91a to an outer surface of the shield 91. When the shield 91 is arranged around the stator 22, each of the lead wires 24 is passed through an inside of a separate one of the recessed portions 911 while the lower end portion of the shield 91 is arranged to be in direct contact with the upper surface of the circuit board 14. The tip portion 242 of the lead wire 24 is passed through a gap between the recessed portion 911 and the circuit board 14 to reach a position away from and radially outward of the outer circumferential surface 234a of the top portion 234 of the stator core 221. The tip portion 242 is soldered to the land portion 14a. The recessed portions 911 defined in the shield 91 contribute to preventing any lead wire 24 from moving in the circumferential direction.

Figure 11:
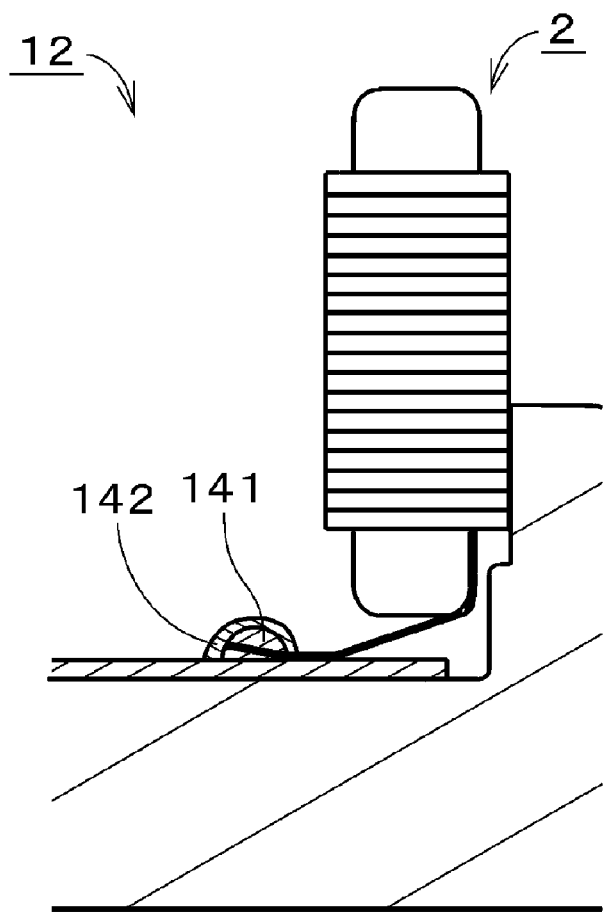
FIG. 11 is a diagram illustrating a stationary portion of a motor according to a preferred embodiment of the present invention.

FIG. 11 is a diagram illustrating a portion of a motor 12 according to yet another preferred embodiment of the present invention. In this motor 12, each solder portion 141 is covered with a resin material 142. The resin material 142 is preferably, for example, an adhesive. When the stationary portion 2 is manufactured, each lead wire 24 is soldered onto the circuit board 14 as illustrated in FIG. 8. After the shield 91 is removed from the stator 22, the resin material 142 is applied to each solder portion 141. The resin material 142 contributes to preventing a gas from being generated from the solder portion 141, and thereby preventing a gas from affecting any disk 11. The structure of the motor 12 and a method of manufacturing the motor 12 according to the present preferred embodiment illustrated in FIG. 11 are otherwise similar to those of the motor 12 illustrated in FIG. 3.

While preferred embodiments of the present invention have been described above, the present invention is not limited to the above-described preferred embodiments, but a variety of modifications are possible. For example, in a modification of any of the above-described preferred embodiments, the shield 91 may not necessarily be cylindrical in shape, but may be shaped so as to include a portion in the shape of a circular or semi-circular arc and centered on the central axis J1 in a plan view. In this case, the inner surface 91a of the shield 91 is preferably arranged to be included in the imaginary cylindrical surface which touches the outer circumferential surface 234a of each top portion 234 of the stator core 221. This enables the shield 91 to be arranged properly along the outer circumferential surfaces 234a. The inner surface 91a of the shield 91 is preferably arranged to extend over half or more than half a circumference of a circle centered on the central axis J1. This makes it easier to arrange the shield 91 around the stator core 221. In the manufacture of the motor 12, a shield in the shape of a plate may be used. Also, a shield in the shape of, for example, a polygon, an ellipse, or the like may be used.

The number of lead wires 24 may be three or any other number more than four. A portion of each solder portion 141 on the circuit board 14 may be arranged to overlap with a radially inner portion of the disk mount portion 313 in the axial direction as long as at least a portion of the solder portion 141 is arranged to overlap with the rotor magnet 321 in the axial direction. Also, each entire solder portion 141 may be arranged to overlap with the rotor magnet 321 in the axial direction. The first housing member 161 may be a member separate from the base portion 21. A structure in which a shaft is arranged to rotate with respect to a sleeve portion fixed to a base portion may be adopted for the motor 12.

Methods in accordance with preferred embodiments of the present invention of soldering the lead wires 24 are also applicable to being used in an inner-rotor motor, in which a rotor magnet is arranged radially inward of a stator. A stator core of the inner-rotor motor includes an annular core back and teeth arranged to extend radially inward from the core back. At the time of the soldering of the lead wires 24, each lead wire 24 is drawn radially inward from the stator 22. That is, each lead wire 24 is drawn to a position away from and radially inward of an imaginary cylindrical surface which touches top surfaces of the teeth. A cylindrical shield centered on the central axis J1 is arranged on the top surfaces of the teeth.

Instead of helium, hydrogen may be used as the gas filled into the interior of the housing 16. Also, a mixture of helium and hydrogen or a mixture of air and any one of helium, hydrogen, and the mixture of helium and hydrogen may be used as the gas filled into the interior of the housing 16.

Preferred embodiments of the present invention are applicable to motors for use in disk drive apparatuses, and also to motors for use in other applications than the disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of manufacturing a motor, the motor including a stationary portion and a rotating portion, the stationary portion including a stator, a base portion, and a circuit board, the method comprising the steps of:
    a) arranging the stator at a predetermined position on the base portion, and arranging a lead wire of a coil of the stator at a position on a far side of an imaginary cylindrical surface centered on a central axis and which touches top surfaces of teeth of a stator core with respect to the top surfaces;
    b) arranging a shield between a land portion of the circuit board and the top surfaces;
    c) soldering the lead wire to the land portion, the lead wire extending along an upper surface of the circuit board through a gap between the shield and the circuit board;
    d) removing the shield; and
    e) attaching the rotating portion to the stationary portion.

2. The method according to claim 1, wherein the shield includes a surface arranged to be included in the imaginary cylindrical surface and to extend over at least half a circumference of a circle centered on the central axis in step b).

3. The method according to claim 1, wherein step b) includes bending the lead wire by bringing the shield into contact with the lead wire.

4. The method according to claim 1, wherein step b) includes bringing a lower end portion of the shield into direct contact with the upper surface of the circuit board or into indirect contact with the upper surface of the circuit board with the lead wire intervening therebetween.

5. The method according to claim 4, wherein
    the lower end portion of the shield includes a recessed portion that is recessed upward; and
    in step c), the lead wire is arranged to pass through a gap between the recessed portion and the circuit board to reach the position on the far side of the imaginary cylindrical surface with respect to the top surfaces.

6. The method according to claim 1, further comprising the step of covering a solder portion arranged on the land portion with a resin material between steps d) and e).

7. A motor manufactured by the method of claim 1, wherein
    the rotating portion includes a rotor magnet; and
    at least a portion of a solder portion on the circuit board is arranged to overlap with the rotor magnet in an axial direction.

8. A motor for use in a disk drive apparatus, the motor comprising:
    a stationary portion including a stator;
    a rotating portion including a rotor magnet arranged radially outward of the stator; and
    a bearing mechanism arranged to support the rotating portion such that the rotating portion is rotatable about a central axis with respect to the stationary portion; wherein
    the stationary portion includes:
        a base portion arranged to define a portion of a housing of the disk drive apparatus; and
        a circuit board arranged on an upper surface of the base portion;
    a lead wire of a coil of the stator includes:
        an inclined portion arranged to extend between the stator and the circuit board while being inclined radially outward with decreasing height;
        a tip portion arranged to extend radially outward along an upper surface of the circuit board, and soldered onto the circuit board outside of a stator core of the stator; and
        a bent or curved portion defined between the inclined portion and the tip portion, and arranged below an outer circumferential surface of the stator core; and
    at least a portion of a solder portion on the circuit board is arranged to overlap with the rotor magnet in an axial direction.

9. The motor according to claim 8, wherein
    the rotating portion further includes an annular disk mount portion including a disk mounted thereon radially outside the rotor magnet; and
    an upper end of the solder portion is arranged at a level higher than that of a lower end of the disk mount portion.

10. The motor according to claim 8, further comprising a resin material arranged to cover the solder portion.

11. A disk drive apparatus comprising:
    the motor of claim 8;
    a disk attached to the rotating portion;
    an access portion arranged to perform at least one of reading and writing of information from or to the disk; and
    a housing member arranged to define, together with the base portion, a housing arranged to contain the disk, the motor, and the access portion; wherein
    an interior of the housing is filled with one of helium, hydrogen, a mixture of helium and hydrogen, and a mixture of air and any one of helium, hydrogen, and the mixture of helium and hydrogen.

12. The disk drive apparatus according to claim 11, wherein the housing includes only one through hole.

13. The motor according to claim 8, wherein
    the rotating portion further includes:
        a hub body;
        a cylindrical portion arranged to project downward from an outer edge portion of the hub body; and
        an annular disk mount portion arranged to extend radially from a bottom portion of the cylindrical portion, and arranged to include a disk mounted thereon;
    the hub body includes a sleeve portion including a hole portion arranged to extend in the axial direction; and
    the sleeve portion includes a communicating hole arranged to extend therethrough from an upper surface to a lower surface thereof in a vicinity of the hole portion.

14. The motor according to claim 13, wherein the bearing mechanism further includes:
    a shaft arranged in the hole portion;

a first cone portion arranged on a lower side of the sleeve portion;

a second cone portion arranged on an upper side of the sleeve portion;

a first cover portion arranged on the bottom portion of the sleeve portion to cover a lower portion of an outside surface of the first cone portion; and a second cover portion arranged on a top portion of the sleeve portion to cover an upper end and an upper portion of an outside surface of the second cone portion.

15. The motor according to claim 14, wherein the first cone portion and a lower portion of an inside surface of the sleeve portion are arranged to together define a first inclined gap therebetween, the first inclined gap being inclined radially outward with decreasing height.

16. The motor according to claim 15, wherein the second cone portion and an upper portion of the inside surface of the sleeve portion are arranged to together define a second inclined gap therebetween, the second inclined gap being inclined radially outward with increasing height.

17. The motor according to claim 16, wherein each of a gap defined between the shaft and a middle portion of the sleeve portion, the first inclined gap, the communicating hole, and the second inclined gap is filled with a lubricating oil.

18. The motor according to claim 17, wherein surfaces of the lubricating oil are arranged in a gap between the first cover portion and the first cone portion and a gap between the second cover portion and the second cone portion.

19. A motor for use in a disk drive apparatus, the motor comprising:

a stationary portion including a stator;

a rotating portion including a rotor magnet arranged radially inward of the stator; and a bearing mechanism arranged to support the rotating portion such that the rotating portion is rotatable about a central axis with respect to the stationary portion; wherein the stationary portion includes:

a base portion arranged to define a portion of a housing of the disk drive apparatus; and a circuit board arranged on an upper surface of the base portion;

a lead wire of a coil of the stator includes:

an inclined portion arranged to extend between the stator and the circuit board while being inclined radially inward with decreasing height;

a tip portion arranged to extend radially inward along an upper surface of the circuit board, and soldered onto the circuit board inside of a stator core of the stator; and a bent or curved portion defined between the inclined portion and the tip portion, and arranged below an inner circumferential surface of the stator core; and at least a portion of a solder portion on the circuit board is arranged to overlap with the rotor magnet in an axial direction.

* * * * *